(12) United States Patent
Leinonen et al.

(10) Patent No.: US 9,806,515 B2
(45) Date of Patent: Oct. 31, 2017

(54) PROTECTION OF CABLES AND CONNECTORS

(71) Applicant: Nokia Corporation, Espoo (FI)

(72) Inventors: Pekka E. Leinonen, Turku (FI); Kai Inha, Jarvenpaa (FI); Timo T. Toivola, Turku (FI); Pekka Talmola, Turku (FI); Timo J. Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 550 days.

(21) Appl. No.: 14/140,336

(22) Filed: Dec. 24, 2013

(65) Prior Publication Data
US 2015/0180221 A1    Jun. 25, 2015

(51) Int. Cl.
H02H 5/04    (2006.01)
H02H 7/22    (2006.01)

(52) U.S. Cl.
CPC .............. *H02H 5/04* (2013.01); *H02H 7/228* (2013.01)

(58) Field of Classification Search
CPC .................................. H02H 5/04; H02H 7/228
See application file for complete search history.

(56) References Cited

U.S. PATENT DOCUMENTS 5,600,306 A * 2/1997 Ichikawa ........... H01R 13/7137
337/1
2009/0167494 A1    7/2009 Martins 2009/0316321 A1 * 12/2009 Ouwerkerk ............... B60L 3/04
361/106
2011/0104940 A1 * 5/2011 Rabu .................. H01R 13/7137
439/502
2011/0121662 A1 * 5/2011 Huang ..................... H02H 3/00
307/125
2012/0071215 A1    3/2012 Bourque et al.
2012/0206840 A1 * 8/2012 Goelz ..................... H02H 5/043
361/1
2013/0108065 A1 * 5/2013 Mullins ............ G01R 31/31701
381/58
2015/0048804 A1    2/2015 Toivanen et al.

FOREIGN PATENT DOCUMENTS

CA          1150769 A1      7/1983
DE      202012011640 U1     3/2013

* cited by examiner

*Primary Examiner* — Zeev V Kitov
(74) *Attorney, Agent, or Firm* — Mintz Levin Cohn Ferris Glovsky and Popeo, P.C.

(57) ABSTRACT

Methods and apparatuses, including computer program code are disclosed herein that provide damage protection to cables and connectors. In one aspect, there is provided an apparatus. The apparatus may include an electrical connector comprising a power supply pin and at least one control pin. The apparatus may further include a protective element configured to change a state of the at least one control pin to cause the power supply pin to become inactive. The protective element may be integrated with the electrical connector and/or integrated at one or more locations along the length of a cable.

19 Claims, 5 Drawing Sheets

PROTECTION OF CABLES AND CONNECTORS

The subject matter described herein relates to protecting cables and/or connectors from overheating.

BACKGROUND

Many modern electronic devices connect to other electronic devices via a cable with connectors on each end that couple with connectors in the electronic devices. For example, many electronic devices include a battery that may be charged from a charging device through a cable. Electronic devices include a wide variety of consumer and industrial products including mobile devices such as cell phones, handheld computing devices, laptops, and the like. As the features and capabilities available in mobile devices have increased, the power consumption of these devices has also increased leading to the need for higher capacity batteries. Increased power consumption and battery capacity has led to the possibility of overheating, which could result in damage to the device or injury to the user. For example, a hand-held cellular telephone that overheats could damage or destroy the phone and/or injure the user's hand or face.

SUMMARY

In one aspect, there is provided an apparatus. The apparatus may include an electrical connector including a power supply pin and at least one control pin. The apparatus may further include a protective element configured to change the at least one control pin from a first state to a second state to cause the power supply pin to become inactive. The protective element may be integrated with the electrical connector and/or integrated at one or more locations along the length of a cable.

In some variations, one or more of the features disclosed herein including the following features can optionally be included in any feasible combination. The electrical connector may be included in a user equipment and/or may couple to a charging source. The electrical connector may comprise a universal serial bus connector. The protective element may be configured to change a state of the at least one control pin when a temperature of the electrical connector is above or equal to a predetermined threshold. The protective element may include an electrical switch, a transistor, a mechanical switch, a non-resettable fuse, an electrically resettable fuse, a manually resettable fuse, and/or a positive or negative temperature coefficient thermistor. The protective element may be configured to change a state of the at least one control pin in response to detecting at least one of a predetermined value of temperature, a predetermined value of humidity, a force, an acceleration, and a processing load. The at least one control pin may comprise a communication control pin in accordance with a universal serial bus. The apparatus may further include control circuitry configured to enable supplying, in response to detecting a first state of the at least one control pin, power via the power supply pin, wherein the control circuitry is further configured to disable, in response to detecting a second state of the at least one control pin, supplying power via the power supply pin.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Figure 1:
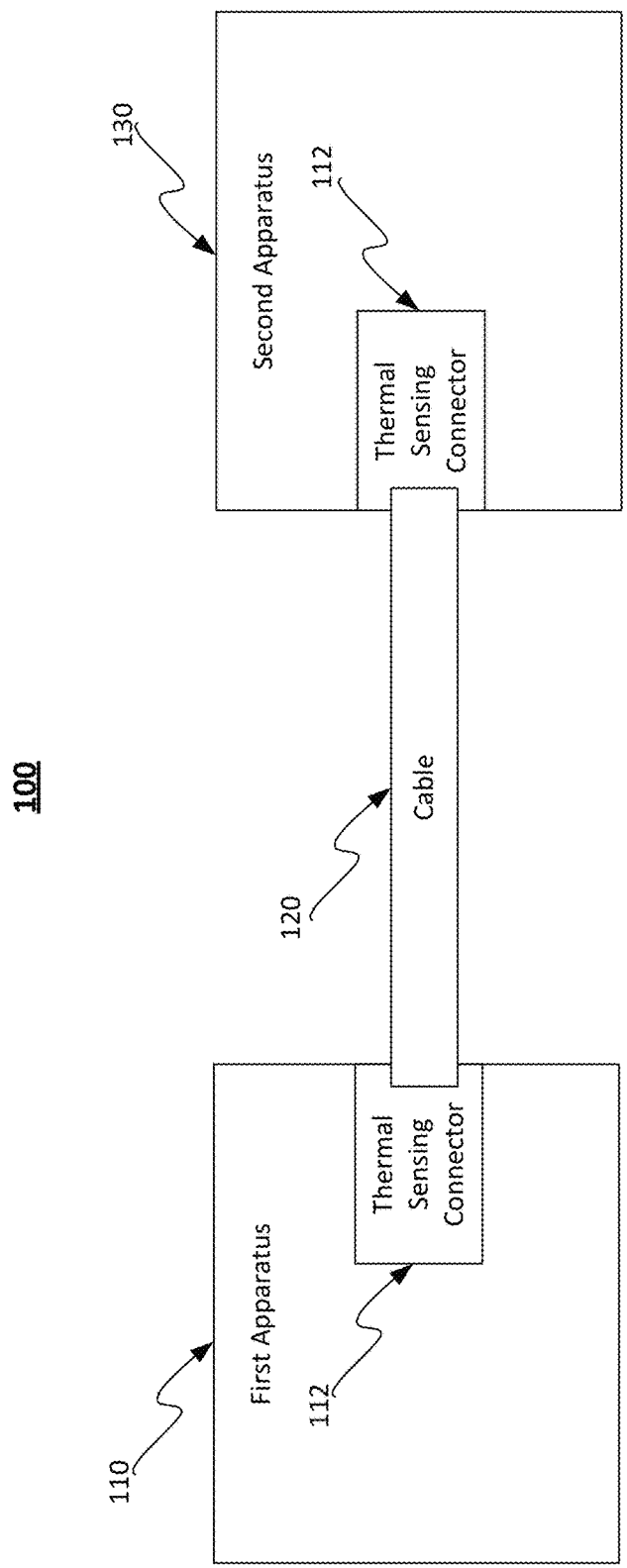
FIG. 1 depicts an example of a system including thermal sensing connectors and/or a thermal sensing cable, in accordance with some example embodiments.

Like labels are used to refer to same or similar items in the drawings.

DETAILED DESCRIPTION

The capability of some modern electronic devices has increased dramatically. Added capability may require additional electrical power to support high-speed processors, displays, and interfaces as well as high-capacity batteries. Moreover, some high-capacity batteries may be capable of being rapidly charged which may require high currents to be carried from a charging source through a connector on the charging source, a cable, and a connector at the electronic device to the battery. Furthermore, some high-capacity batteries may be capable of being rapidly discharged which may result in high currents being carried from the battery through a connector on the electronic device, a cable, and a connector at another electronic device. As the power carried through these connector interfaces increases by providing increased voltages and/or currents, the risk that overheating at one or more of the connectors and/or in the cable may also increase.

Some electronic devices may be considered mobile devices. These electronic devices include for example, cell phones, portable computers, gaming devices, and the like. Mobile devices may be subject to exposure to contaminants including dirt, moisture, and the like. Exposure to some contaminants in a connector may provide an unintended path for current to flow inside the connector. If exposed to conductive contaminants, the unintended path for current may have a low value of resistance allowing enough power to be dissipated in the connector as heat to cause the connector materials to melt. When this is the case, the current may flow across the connector (for example, from the positive side of the power source in the connector to the negative side of the power source in the connector and not substantially through any cable that may be connected to the connector). A thermal sensing connector may cause one or more electrical contacts in the connector to become inactive thereby reducing or eliminating the continued thermal rise in the connector.

To illustrate further, contaminants may interfere with the connection between the connector in a mobile device and connector in a cable. The contaminants may cause a high series resistance in the connection. With power flowing through the cable from a device such as a charger to a mobile device, the high-resistance series resistance due to the contaminants may dissipate enough power to cause the connector materials to heat to the point of melting. A thermal sensing connector may cause one or more electrical contacts in the connector to become inactive thereby reducing or eliminating the continued thermal rise in the connector.

Devices, such as a mobile device and a charging device, may not have thermal sensing connectors. However, the overheating problems described above (as well as others) may be mitigated, in some example embodiments, with a cable that includes thermal sensing connectors. When the cable includes thermal sensing connectors, even though the electronic devices attached to each end of the cable do not have thermal sensing connectors, the cable does. Because the device connectors mated with the cable connectors may be in close proximity as they would need to be in order to make electrical contact, the electronic device connector and cable connector may also be thermally connected. If the temperature rises in the device connector mated to the cable connector, the thermal sensing connector in the cable may cause one or more electrical contacts in the connector to become inactive thereby reducing or eliminating the continued thermal rise in the connector.

In some example embodiments, a thermal sensing connector in a mobile device may protect the mobile device from overheating at the connector. In some example embodiments, a thermal sensing connector in an accessory device such as a charger may protect the accessory device from overheating at the connector. In some example embodiments, a thermal sensing connector built into a cable that interconnects a mobile device to an accessory device may protect the mobile device and/or accessory device from overheating at the connectors. In some example embodiments, a thermal sensing component placed at locations along the length of a cable may protect the cable and/or devices from overheating.

FIG. 1 depicts an example of a system including thermal sensing connectors and a thermal sensing cable, in accordance with some example embodiments. A first apparatus 110 may include a thermal sensing connector 112, and a second apparatus 130 may include a thermal sensing connector. Cable 120 may provide an electrical connection between the first apparatus 110 and second apparatus 130.

First apparatus 110 may be any type of electronic apparatus such as a charging device, a mobile device, a computer, and the like. For example, apparatus 110 may be a charging device such as a wall powered alternating-current (AC) to direct-current (DC) converter designed to supply power through a cable such as cable 120 to a second apparatus such as second apparatus 130. The first apparatus 110 may include a thermal sensing connector 112. The thermal sensing connector may cause disconnection of one or more contacts in the connector at and above a predetermined temperature inside the connector. The predetermined temperature may be selected by the design of the connector. The temperature may be selected to be low enough to prevent damage to the materials on the connector and attached cable as well as being selected so that the exterior does not reach a temperature that could injury to a person touching the connector.

Thermal sensing connector 112 may be designed to include one or more of a one-time thermal fuse, a bi-metallic thermal circuit breaker with automatic or manual recovery, a negative temperature coefficient (NTC) thermal sensing resistor, a positive temperature coefficient (PTC) resettable fuse, an electrical switch, a transistor, a mechanical switch, a non-resettable fuse, an electrically resettable fuse, a manually resettable fuse, and/or a PTC thermistor as the protective element 210. PTC resettable fuses may be referred to as resettable fuses, polyfuses, or polyswitches. The thermal sensing connector 112 may also include one or more diodes and transistors as the thermal sensing element 210. If the thermal sensing connector 112 rises to or above a predetermined value, the connector causes disconnection of one or more electrical connections inside the connector. In some example embodiments, the thermal sensing connector 112 sends a signal to the connected electronic device to cause one or more connections inside the connector 112 to become inactive causing the temperature to fall. For example, the thermal sensing connector 112 may provide an indication of, or send a signal to, apparatus 110 indicating the temperature is at or above the predetermined value. Apparatus 110 may disconnect via a transistor or other switching device in apparatus 110 a power source from apparatus 130 to cause the temperature in connector 112 to drop.

Second apparatus 130 may also have a thermal sensing connector 112 similar to the first apparatus 110, or the thermal sensing connector in apparatus 112 may utilize a different thermal sensing method than the method used at apparatus 110. Apparatus 130 may be any type of electronic apparatus listed above. Continuing the example above, the first apparatus 110 may be a charger. The second apparatus 130 may be, for example, a mobile phone that includes a battery. The first apparatus may charge the battery in second apparatus 130 through a cable such as cable 120.

In some example embodiments, cable 120 may include standard connectors that have no thermal sensing ability. Thermal sensing connectors in first apparatus 110 and/or second apparatus 130 may protect both ends of the cable from overheating. In some example embodiments, cable 120 may include thermal sensing connectors and the first apparatus and/or second apparatus may also include thermal sensing connectors. Thus, first apparatus 110 may include a thermal sensing connector and cable 120 connected to first apparatus 110 may also include a thermal sensing connector 112. Second apparatus 130 may include a thermal sensing connector and cable 120 connected to second apparatus 130 may also include a thermal sensing connector 112. In some example embodiments, first apparatus 110 and/or second apparatus 130 may include standard connectors that are not thermal sensing. In this case, cable 120 may include at least one thermal sensing connector 112 that protects first apparatus 110 and/or second apparatus 130 from thermal damage.

In some example embodiments, cable 120 may include thermal sensing structures in the cable with thermal sensing structures placed at one or more locations along the length of the cable. This arrangement may protect the cable itself from overheating due to excessive power being passed through the cable. For example, if the cable were to be short-circuited, a high current passed through the cable could cause overheating depending on the gauge of the wire in the cable.

Figure 2:
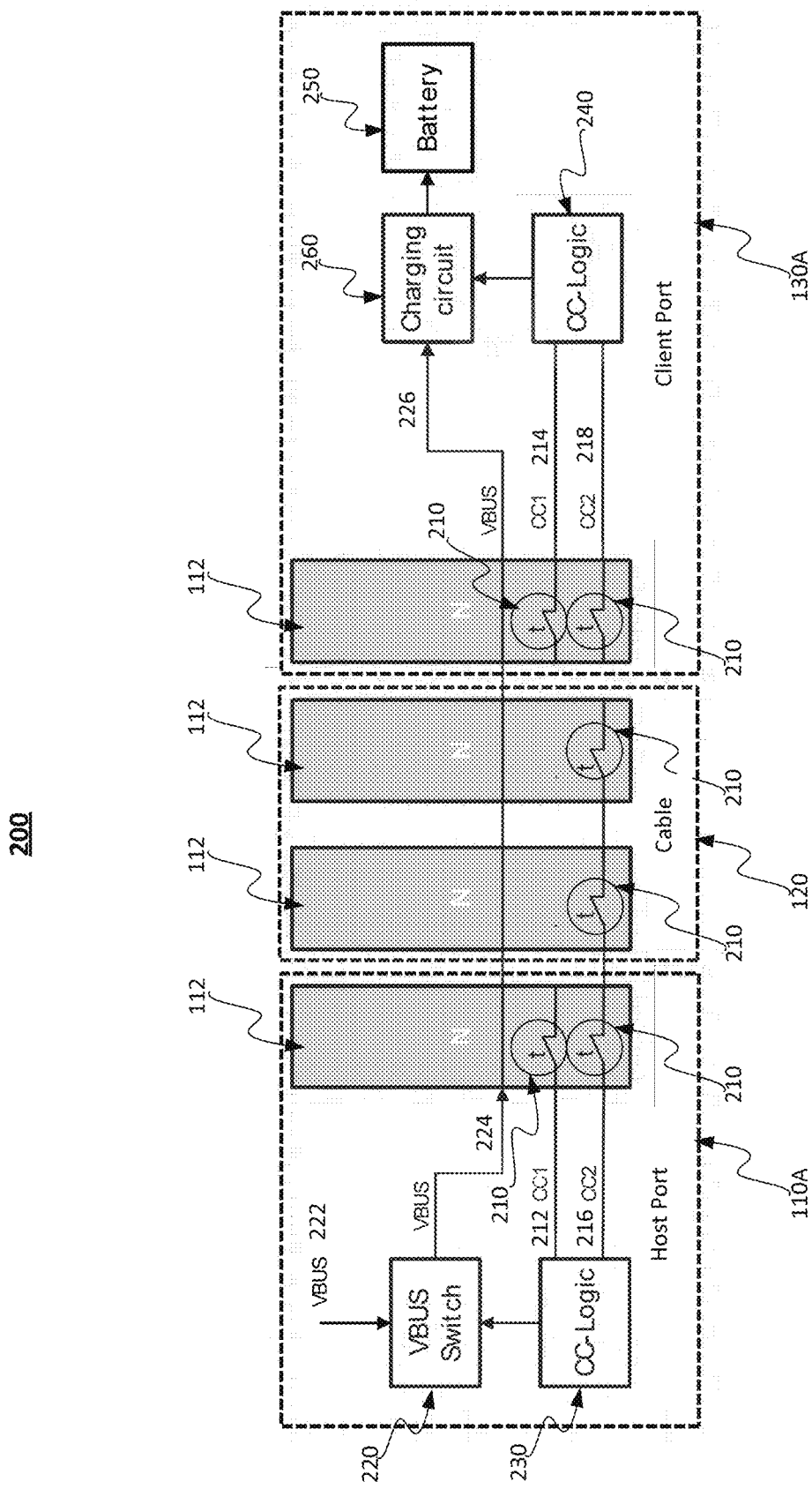
FIG. 2 depicts another example of a system including thermal sensing connectors and a cable including thermal sensing connectors, in accordance with some example embodiments.

FIG. 2 depicts an example of a system including thermal sensing connectors and a cable including thermal sensing connectors, in accordance with some example embodiments. A host port 110A with charging capability may be connected through cable 120 to client port 130A. If the temperature of one of the thermal sensing connectors rises above a predetermined temperature, the thermal sensing connector may cause the power to stop flowing, thereby protecting the apparatuses 110A and 130A as well as the cable 120 from damage (which may also prevent injury to someone coming into contact with the apparatuses or cable).

Host port 110A may include a power connection 222 to provide power to host port 110A and/or client port 130A. For example, in some embodiments power connection 222 may include a Universal Serial Bus VBUS as shown in FIG. 2. A power source may be integrated into host port 110A. For example, host port 110A may include an AC-DC power converter or a battery (not shown in FIG. 2) to provide the source of power for power connection 222. Power delivery from power connection 222 to client port 130A may be controlled by switch 220. When switch 220 is turned on, power may flow to the client port. The power may be used by client port 130A to charge a battery 250 using charging circuit 260 connected to power pin 226 supplied by power source 222 through connectors 112 and cable 120. When the switch is turned off, no power may flow to client port 130A. Switch 220 may be controlled by communication control logic 230. Depending on the states of the communication control logic inputs 212 and 216, logic 230 may cause switch 220 to be turned on or off. For example, in some example embodiments when logic inputs 212 and 216 are open (that is no connection of logic inputs 212 and 216 is made to logic inputs 214 and 218 of logic 240 in client port 130A), logic 230A may cause switch 220 to turn off thereby disconnecting connectors 112 and client port 130A from power source 222. In some embodiments, the host port 110A and/or the client port 130A may comprise only one logic input, for example logic input 216 or 218.

Logic inputs 212, 214, 216, 218 may be referred to as communication control (CC) pins, which may be configured to control power that may be supplied from power source 222 to pin 224. A state of one or more control pins may refer to at least a current level or a voltage level at inputs to the logic circuitry 230 or logic circuitry 240. A control pin may correspond to a pin in connector 112 and/or a wire in cable 120.

In some example embodiments, there may be four possible states of connection logic inputs 212 and 216 to logic inputs 214 and 218. In some configurations, such as the configuration shown in the example of FIG. 2, logic input 216 of logic 230 may connect through connectors 112 and cable 120 to logic input 218 of logic 240 with no connection made to logic inputs 214 or 212. In some configurations, logic input 216 of logic 230 may connect through connectors 112 and cable 120 to logic input 214 of logic 240 with no connections to logic inputs 212 and 218. In some configurations, logic input 212 of logic 230 may connect through connectors 112 and cable 120 to logic input 214 of logic 240 with no connections to logic inputs 216 and 218. In some configurations, logic input 212 of logic 230 may connect through connectors 112 and cable 120 to logic input 218 of logic 240 with no connections to logic inputs 216 and 214. Which of the four above-noted states is selected may depend on cable 120 and an orientation of the connectors 112 of cable 120 at host port 110A and client port 130A. For example, when connectors 112 are symmetric (that is when connectors 112 of cable 120 may be mated to the host port 110A and client port 130A in two possible orientations each), four possible combinations of connector orientations of cable 120 may be possible. Some embodiments directed to a universal serial bus (USB) may utilize symmetrical connectors as described above.

In some example embodiments such as the example of FIG. 2, host port logic 230 may be configured so that if none of the above-noted four configurations is present, logic 230 disconnects power 222 from connector 112 at pin 224 via switch 220. For example, if neither 212 nor 216 is connected to either 214 or 218, then logic 230 disconnects power to pin 224 via switch 220. This may occur when no cable interconnects host port 110A and client port 130A, or when a thermal sensing device breaks the connection between host port 110A and client port 130A. The thermal sensing device may be connected in series with one or more communication control pins as shown in FIG. 2, or in another arrangement. The connection may also be broken by thermal sensing connectors 112 and/or a thermal sensing cable 120 causing logic inputs 212 and 216 to become disconnected from 214 and 218. An example of another arrangement includes the thermal sensing devices being configured to connect one or more control pins to a predetermined voltage when the temperature is above a predetermined threshold. Logic 230 may then disconnect power from pin 224 via switch 220. Disconnecting power by switch 220 causes pin 224 of the host port 110A to become inactive, that is, power is not supplied by host port 110A to pin 224. Disconnecting power by switch 220 causes the pin 226 the client port 130A to become inactive, that is, power is no longer supplied to pin 226 of client port 130A. Because the logic inputs require very little current, the temperature sensing components may be made small, making them easier to integrate into connectors and less expensive than they would be if the temperature sensing components were integrated into the power carrying connection between power supplying pin 224 of host port 110A and pin 226 of client port 130A.

FIG. 2 at 210 shows protective elements as described above with respect to FIG. 1. In some embodiments, the protective element is thermal sensing. For example, 210 may be a thermal switch. As described above, thermal switches may be present in one or both of the connectors at each apparatus 110A and 130A, as well as at one or both ends of cable 120. Cable 120 itself may have thermal switches (or other devices) embedded along the length of the cable.

Figure 3:
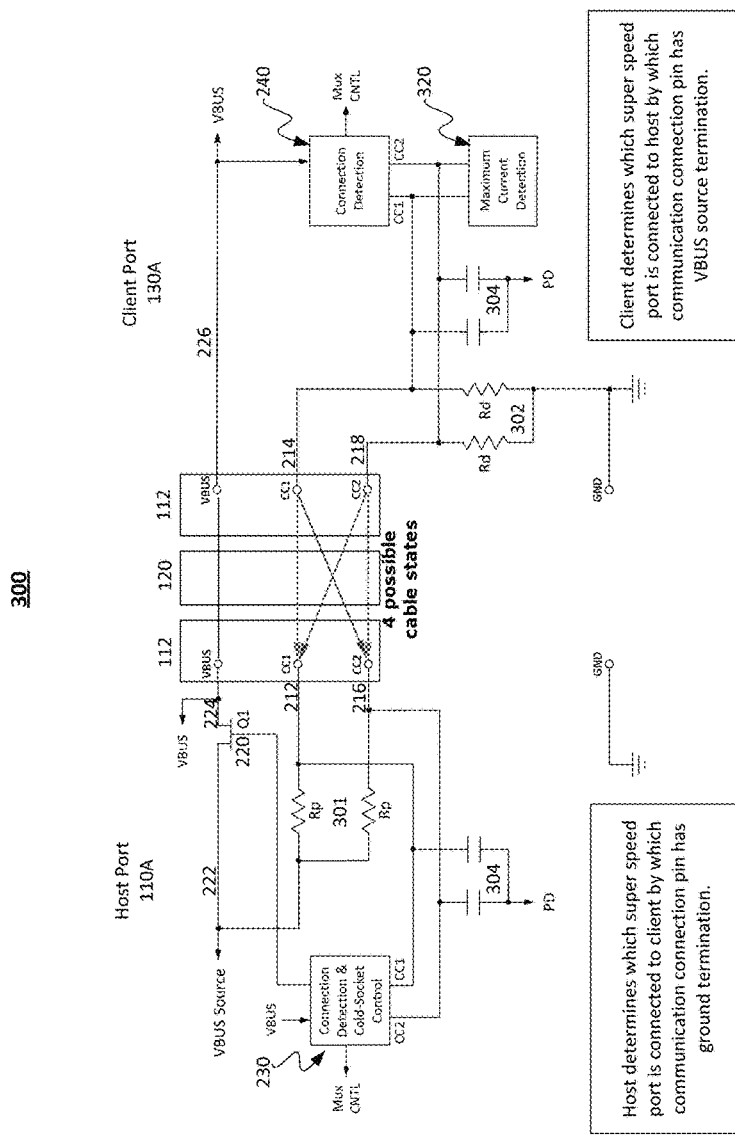
FIG. 3 depicts an example of a system that may utilize a thermal sensing cable and/or connectors, in accordance with some example embodiments.

FIG. 3 depicts an example of a system that may utilize a thermal sensing cable 120 and/or connectors 112, in accordance with some example embodiments. System 300 may include a first apparatus configured as a host port 110A and a second apparatus configured as a client port 130A. Host port 110A may be connected to client port 130A via a cable such as cable 120 shown in FIG. 2. Power may be supplied through cable 120 from host port 110A to client port 130A.

Depending on the orientation of cable 120, one of four states of connection between logic inputs 212 and 216 to 214 and 218 may be selected. For example, cable 120 may be attached to host port 110A to client port 130A as shown in FIG. 2 where logic input 216 is connected to logic input 218 through cable 120 and logic inputs 212 and 214 are not connected. With this configuration of cable 120, logic input 212 of host port 110A may be pulled by resistor 301 to the voltage at source 222, and logic input 214 of client port 130A may be pulled down to ground (substantially zero volts or some other value as well) through resistor 302. Logic inputs 212 and 214 may be connected through cable 120, and both may have a voltage between the source 222 voltage and ground set by the resistor divider of 301 and 302. Because of the voltages at logic inputs 212, 214, 216, and 218, host port 110A and client port 130A may determine the orientations of both connectors at the ends of cable 120.

Figure 4:
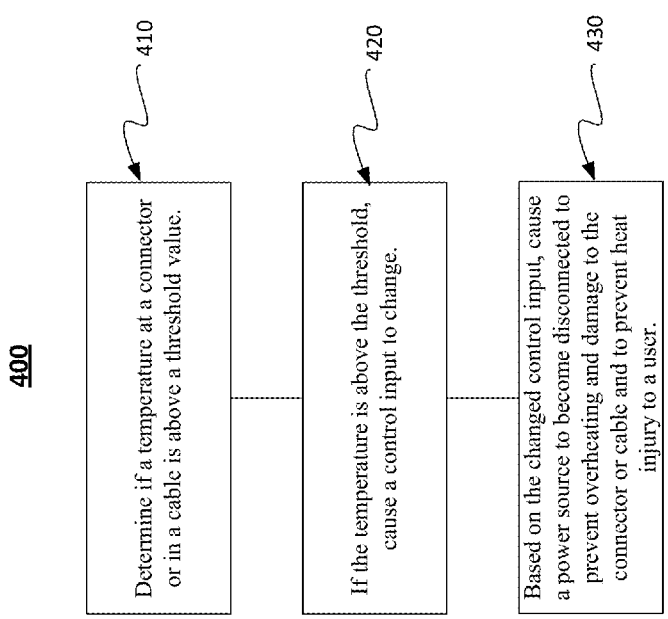
FIG. 4 depicts a process for protecting an apparatus and/or cable from thermal damage, in accordance with some example embodiments.

FIG. 4 depicts a process 400 for protecting an apparatus and/or cable from thermal damage, in accordance with some example embodiments. At 410, it may be determined if the temperature of a connector or cable is above a threshold value. At 420, if the temperature is above the threshold value, a control input may be changed, otherwise the control input may be maintained. At 430, based on the changed control input, a power source may be disconnected to prevent damage to the connector or cable and prevent injury to a user.

At 410, it may be determined if the temperature of a connector or cable is above a threshold value, in accordance with some example embodiments. In some example embodiments, the determination of whether the temperature is above a threshold value may be performed based on a temperature measurement made via a thermistor or thermocouple, or the like. In some example embodiments, the threshold value may be selected based on the known melting temperatures of the materials used in the connector and/or cable. The threshold value may also be based on a temperature that is safe for a user to touch beyond which the user may be burned, for example, the temperature of a charging connector for an electronic device such as a cell phone. In some example embodiments, whether the temperature is above a threshold value may be determined based the state of a thermal fuse, a bi-metallic thermal circuit breaker with automatic or manual recovery, a negative temperature coefficient (NTC) thermal sensing resistor and a positive temperature coefficient (PTC) resettable fuse as described above. For bimetallic devices and thermal fuses, when the temperature is above a threshold value set by the design of the device, the device may be in one state, such as in an off state; below the threshold temperature, the device may be in another state, such as an on state. Whether the temperature of the thermal connector is above the threshold may be determined by the state of the thermal fuse/bimetallic device being on or off. For thermal sensing resistors, whether the temperature of the connector is above a threshold value may be based on a resistance value of a thermal sensing resistor.

In some example embodiments, based on the determination of whether the temperature is above the threshold value, a control input may be changed at 420. For example, if the temperature of a thermal sensing connector 112 in FIG. 2 rises above the predetermined threshold value, a thermal sensing switch 210 may switch from being on (or closed) to off (or open). In the example of FIGS. 2 and 3, the opening of one of the thermal switches along the path from 216 in host port 110A to 218 at client port 130A may cause the voltage at 216 to change from the voltage determined by the resistor divider of resistors 301 and 302, to the higher voltage of source 222. The voltage at 218 of client port 130A may change from the voltage determined by the resistor divider to the lower voltage of ground.

At 430, based on the changed control input, a power source may be disconnected to prevent damage to the connector or cable and/or prevent injury to a user, in accordance with some example embodiments. For example, as described above with respect to FIGS. 2 and 3, the change in control inputs 216 and/or 218 may cause power source 222 to become disconnected from pin 226 at client port 130A via logic 230 and switch 220.

Although the example of FIGS. 2 and 3 have certain changes in voltage depending on thermal sensing connecters 112 and/or cable 120, other voltage changes are also possible. Moreover, any number of logic inputs (e.g. 212, 214, 216, 218) may also be used.

Figure 5:
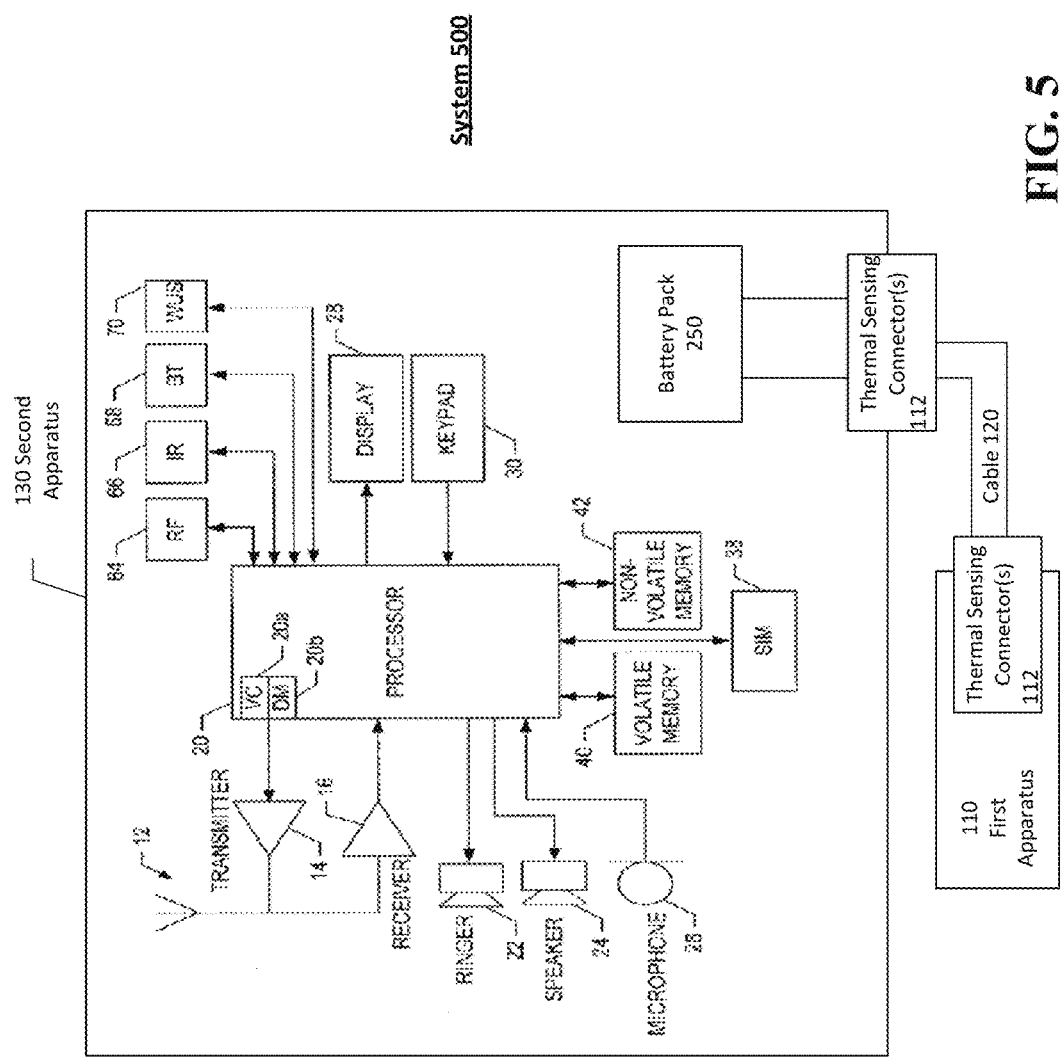
FIG. 5 depicts an example of a battery-powered device, in accordance with some example embodiments.

FIG. 5 depicts an example of a system 500 including a battery-powered second apparatus 130 connected through cable 120 to a first apparatus 110, in accordance with some example embodiments. FIG. 5 at 130 depicts a battery-powered apparatus 130 comprising a user equipment, such as a cellular telephone, a smartphone, and the like.

In some example embodiments, the second apparatus 130 may include a thermal sensing connector 112 coupled to a battery (or battery pack) 250. In some example embodiments, a charging circuit such as charging circuit 260 of FIG. 2 may reside between battery 250 and connector 112. In some example embodiments, second apparatus 130 may include a user equipment, mobile station, or other cellular device. In some example embodiments, first apparatus 110 may be a charger such as an AC-DC wall adapter. First apparatus 110 and/or cable 120 may also include thermal sensing connectors. In some example embodiments, the second apparatus may be configured to operate as a host device and comprise similar functions as first apparatus 110.

In some example embodiments, the first apparatus 110 or the second apparatus may be configured to control at least one switch 210 based on at least one measure other than temperature. For example, an apparatus 110 and/or 130 may monitor one or more measures that indicate a possible failure or an increased risk for a failure in the apparatus. For example, protective element 210 may be configured to change state of at least one control pin when exceeding a predetermined level of humidity, a level of force, a processing load, an acceleration, and/or detecting activity of a predetermined function in the apparatus.

The apparatus 130 may include at least one antenna 12 in communication with a transmitter 14 and a receiver 16. Alternatively transmit and receive antennas may be separate.

The apparatus 130 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 3 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 130 may include a location processor and/or an interface to obtain location information, such as positioning and/or navigation information. Accordingly, although illustrated in FIG. 1 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 130 may be capable of operating with one or more air interface standards, communication protocols, modulation types, access types, and/or the like. For example, the apparatus 130 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 130 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 130 may be capable of operating in accordance with 2.5G wireless communication protocols General Packet Radio Service (GPRS), Enhanced Data GSM Environment (EDGE), and/or the like. Further, for example, the apparatus 130 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 130 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 130. For example, the processor 20 may comprise a digital signal processor device, a microprocessor device, an analog-to-digital converter, a digital-to-analog converter, and/or the like. Control and signal processing functions of the apparatus 130 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 130 to perform actions. For example, processor 20 may be capable of operating a connectivity program, such as, a web browser. The connectivity program may allow the apparatus 130 to transmit and receive web content, such as location-based content, according to a protocol, such as, wireless application protocol, WAP, hypertext transfer protocol, HTTP, and/or the like.

Apparatus 130 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 130 may include a battery for powering various circuits related to the mobile terminal, for example, a circuit to provide mechanical vibration as a detectable output. The user input interface may comprise devices allowing the apparatus 130 to receive data, such as, a keypad 30 (which can be a virtual keyboard presented on display 28 or an externally coupled keyboard) and/or other input devices.

Moreover, the apparatus 130 may include a short-range radio frequency (RF) transceiver and/or interrogator 64, so data may be shared with and/or obtained from electronic devices in accordance with RF techniques. The apparatus 130 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 130 and, in particular, the short-range transceiver may be capable of transmitting data to and/or receiving data from electronic devices within a proximity of the apparatus, such as within 10 meters. The apparatus 130 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 130 may comprise memory, such as, a subscriber identity module (SIM) 38, a removable user identity module (R-UIM), and/or the like, which may store information elements related to a mobile subscriber. In addition to the SIM, the apparatus 130 may include other removable and/or fixed memory. The apparatus 130 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 130. The functions may include one or more of the operations disclosed herein with respect to battery protection disclosed herein including the process flow of FIG. 4 and the like. The memories may comprise an identifier, such as, an international mobile equipment identification (IMEI) code, capable of uniquely identifying apparatus 130. In the example embodiment, the processor 20 may be configured using computer code stored at memory 40 and/or 42 to provide the operations disclosed with respect to the process shown in FIG. 4 and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIG. 4 and/or the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, WiFi, and the like, the subject matter described herein is not limited to those technologies, and, as such, can be used with other radio technologies as well.

Without in any way limiting the scope, interpretation, or application of the claims appearing below, a technical effect of one or more of the example embodiments disclosed herein is to protect electronic devices from overheating using thermal sensing components in connectors and cables to cause a power supply to become disabled.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. An apparatus comprising:
    an electrical connector comprising a power supply pin and at least two control pins, the power supply pin configured to carry power and the at least two control pins configured to carry at least control signals;
    logic circuitry coupled to the at least two control pins, the logic circuitry configured to determine, based on detection of a voltage at a first control pin of the at least two control pins, an orientation of another connector coupled with the electrical connector; and
    a protective element coupled to the at least two control pins, the protective element being configured to change a second control pin of the at least two control pins from a first state to a second state, wherein the change of the second control pin from the first state to the second state causes the power supply pin to become inactive.

2. The apparatus of claim 1, wherein the protective element is configured to change the second control pin from the first state to the second state when a temperature of the electrical connector is above or equal to a predetermined threshold.

3. The apparatus of claim 1, further comprising:
    control circuitry configured to enable supplying, in response to detecting the first state of the second control pin, power via the power supply pin, the control circuitry being further configured to disable, in response to detecting the second state of the second control pin, supplying power via the power supply pin.

4. The apparatus of claim 1, wherein the electrical connector comprises a universal serial bus connector.

5. The apparatus of claim 1, wherein the protective element includes at least one of an electrical switch, a transistor, a mechanical switch, a non-resettable fuse, an electrically resettable fuse, a manually resettable fuse, and a positive or negative temperature coefficient thermistor.

6. The apparatus of claim 1, wherein at least one of the at least two control pins comprises a communication control pin in accordance with a universal serial bus.

7. The apparatus of claim 1 wherein the protective element is connected in series with the at least two control pins.

8. The apparatus of claim 1, wherein a user equipment includes the electrical connector, wherein the user equipment is configured to wirelessly couple to a cellular base station.

9. The apparatus of claim 1, wherein the electrical connector couples to a charging source.

10. The apparatus of claim 1, wherein the protective element is further configured to change the at least second control pin from the first state to the second state in response to detecting at least one of a predetermined value of humidity, a force, an acceleration, and a processing load.

11. A method comprising:
   determining, by logic circuitry coupled to at least two control pins, based on detection of a voltage at a first control pin of the at least two control pins, an orientation of another connector coupled with an electrical connector, the electrical connector including a power supply pin and the at least two control pins; and
   changing, by a protective element coupled to the at least two control pins, a second control pin of the at least two control pins from a first state to a second state, wherein the change of the second control pin from the first state to the second state causes the power supply pin to become inactive.

12. The method of claim 11, further comprising:
   enabling, in response to detecting the first state of the second control pin, power to be supplied via the power supply pin; and
   disabling, in response to detecting the second state of the second control pin, power from being supplied via the power supply pin, wherein the protective element is configured to change the second control pin from the first state to the second state when a temperature of the electrical connector is above or equal to a predetermined threshold.

13. The method of claim 11, wherein the electrical connector comprises a universal serial bus connector, and wherein at least one of the at least two control pins comprises a communication control pin in accordance with a universal serial bus.

14. The method of claim 11, wherein the protective element includes at least one of an electrical switch, a transistor, a mechanical switch, a non-resettable fuse, an electrically resettable fuse, a manually resettable fuse, and a positive or negative temperature coefficient thermistor.

15. The method of claim 11, wherein the protective element is connected in series with the at least two control pins.

16. The method of claim 11, wherein the protective element is further configured to change the second control pin from the first state to the second state in response to detecting at least one of a predetermined value of humidity, a force, an acceleration, and a processing load.

17. A non-transitory computer-readable medium encoded with instructions that, when executed by at least one processor, perform at least the following:
   determining, by logic circuitry coupled to at least two control pins, based on detection of a voltage at a first control pin of the at least two control pins, an orientation of another connector coupled with an electrical connector, the electrical connector including a power supply pin and the at least two control pins; and
   changing, by a protective element coupled to the at least two control pins, a second control pin of the at least two control pins from a first state to a second state, wherein the change of the second control pin from the first state to the second state causes the power supply pin to become inactive.

18. The apparatus of claim 1, wherein the first control pin and the second control pin are the same pin.

19. The method of claim 11, wherein the first control pin and the second control pin are different pins.

* * * * *